M. DEACON & W. GORE.
FILTERING APPARATUS.
APPLICATION FILED JAN. 27, 1911.
1,007,929.
Patented Nov. 7, 1911.
3 SHEETS—SHEET 3.
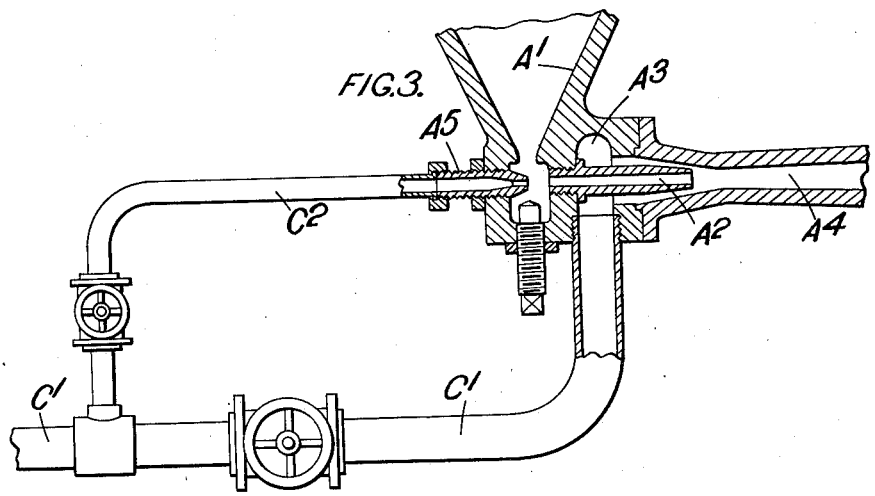
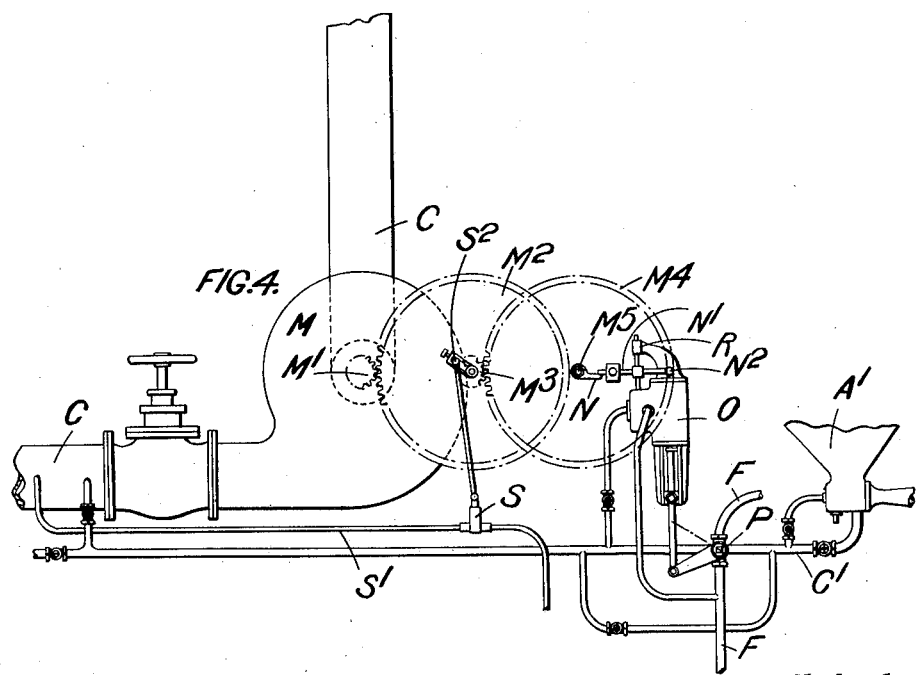
Witnesses.
Inventors:
Martin Deacon and
William Gore

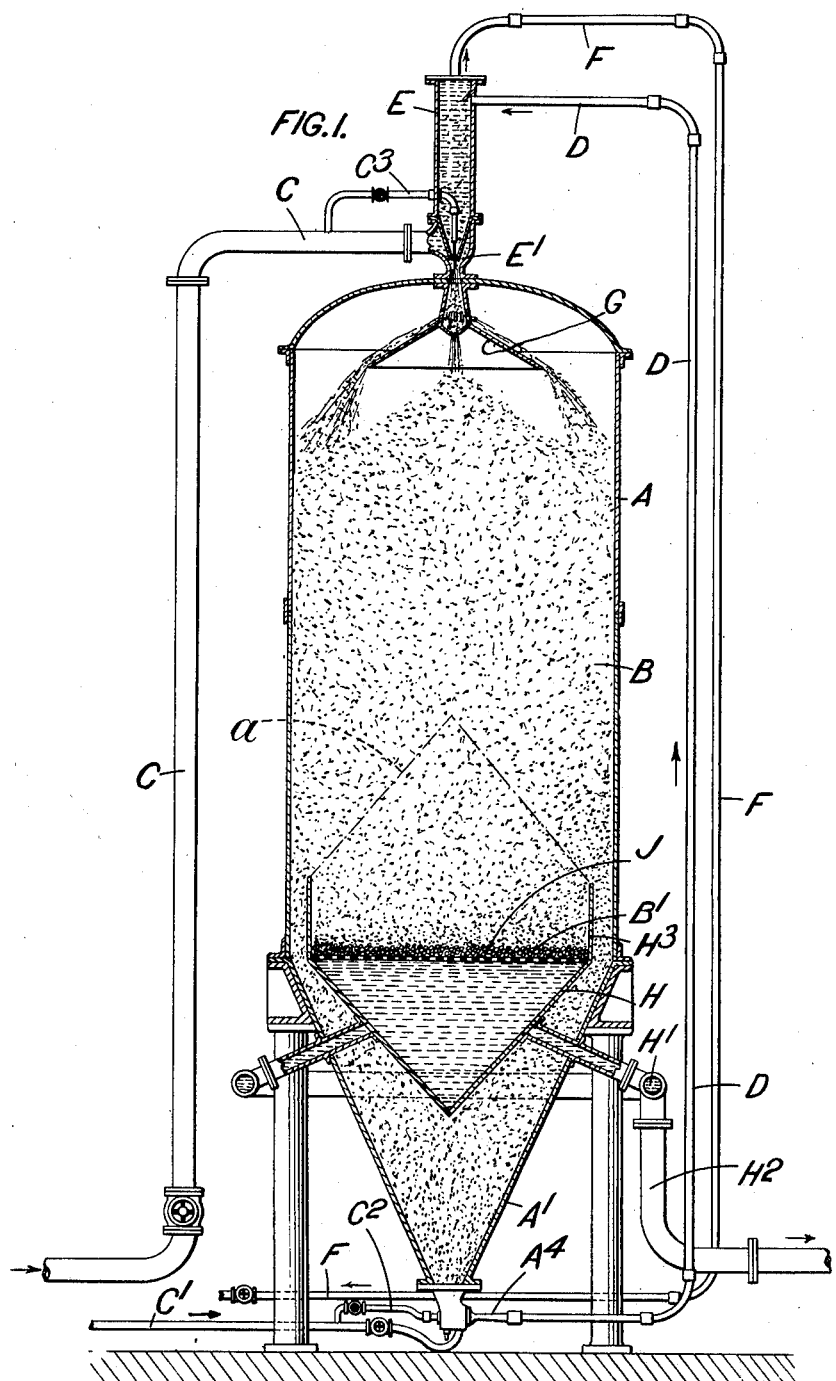

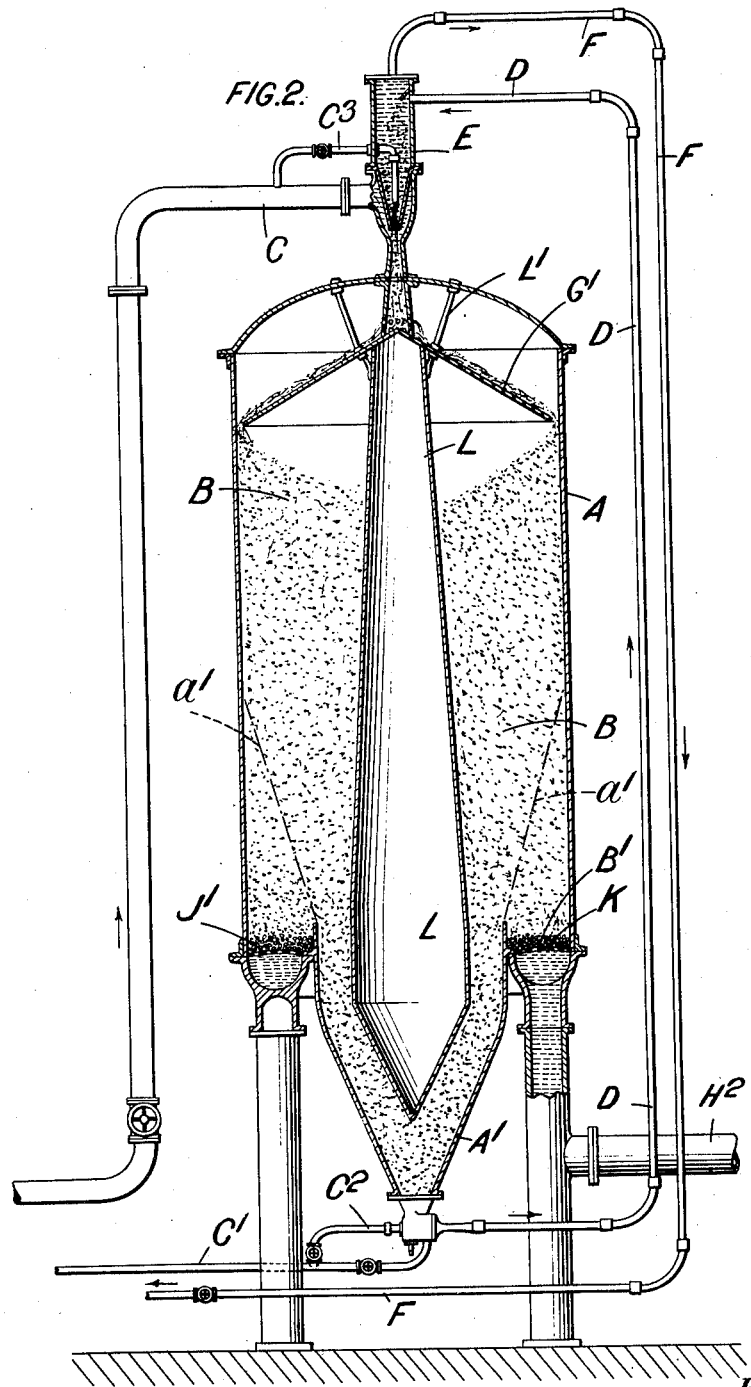

UNITED STATES PATENT OFFICE.

MARTIN DEACON AND WILLIAM GORE, OF LONDON, ENGLAND, ASSIGNORS OF ONE-THIRD TO PALATINE ENGINEERING COMPANY LIMITED, OF LIVERPOOL, ENGLAND.

FILTERING APPARATUS.

1,007,929.  Specification of Letters Patent.  Patented Nov. 7, 1911.

Application filed January 27, 1911. Serial No. 605,082.

*To all whom it may concern:*

Be it known that we, MARTIN DEACON and WILLIAM GORE, subjects of the King of England, residing at London, in England, have invented certain new and useful Improvements in Filtering Apparatus, of which the following is a specification.

This invention relates to filtering apparatus and has special reference to the treatment of water, although it may be used for other liquids.

It is well known that in filter beds the filtering action is due largely to a film or layer which is gradually formed on or near the top of the sand and that, in course of time, this layer gets too thick and lowers the rate at which filtering takes place so that the bed has to be put out of action temporarily while the layer is removed or reduced in thickness. Further, the filter has to remain out of use until such time as the filtering layer or film has again been formed by the passage of water which is sent to waste. Various mechanical filters have been proposed in which a coagulant has been employed with sand or the like to make a filtering medium, but hitherto it has been found necessary to stop the operation of the apparatus at frequent intervals to reverse the flow of the water through the filter, and to stir up the medium by means of agitators, stirring arms or the like. After the cleaning has taken place, the water passing through these filters is also sent to waste until the film is reformed. Thus, delay, waste of water and labor have been incurred in both instances. This disadvantage is obviated according to this invention by causing small portions of the sand or other medium to be removed and replaced during the operation of the filter, the removal taking place—in a filter in which the liquid passes downward through the medium—from the lower or inactive portion of the mass of the medium, and the sand, etc., which is removed being cleansed and placed at the top of the mass. This process is arranged to take place automatically and practically continuously or at predetermined intervals without causing any interruption of the working of the apparatus. The transference of the medium little by little from the bottom to the top is preferably accomplished by the water itself which is caused to act ejector-fashion upon the medium at the lower end of the containing vessel, carrying the sand, etc., up through a pipe to a box or receiver above the main body of the filtering medium, whence it is distributed over the top of the mass.

In the improved filter, as in other filters, the thin film or layer forms upon the surface of the sand or other medium, but an advantage of the improved construction is that many such films are formed one after the other, and thus the filter becomes extremely efficient; for example, supposing the first film to have been formed, the sand removed from the bottom and placed as described upon the top of the mass covers it up and another film then forms on top of the sand. This in its turn is covered by more sand and so on. Thus gradually the whole depth of the sand becomes effective and any germ or impurity which may perhaps escape the first filtering film is likely to be arrested by one of the lower films.

In the accompanying drawings which are all diagrammatic, Figure 1 is a vertical central section showing one construction of filter according to this invention, Fig. 2 is a similar view of another form of filter also according to this invention, Fig. 3 is a vertical central section showing the bottom portion of the filter on a larger scale, and Fig. 4 is an elevation showing one arrangement of controlling mechanism suitable for use with a filter according to this invention.

Like letters indicate like parts throughout the drawings.

With reference first to Fig. 1, a cylindrical containing vessel A supported on legs or standards is provided with a hopper-like or tapered bottom $A^1$ having an outlet $A^2$ (Fig. 3) at its lower extremity. The vessel A contains the sand or other filtering medium B and is supplied with the water to be filtered through the pipe C. A branch $C^1$ from this unfiltered water pipe C, or some independent source, is connected to an inlet passage $A^3$ adjacent to the outlet opening $A^2$ (see Fig. 3), and the water passing through the passage $A^3$ flows out by an outlet $A^4$ acting, ejector fashion, upon the sand in the opening $A^2$ and causing it to pass out through the outlet $A^4$ with the water. Conveniently an additional pipe $C^2$ is provided leading from the pipe $C^1$ to an inlet nozzle $A^5$ opposite to the sand outlet $A^2$ and the jet of water passing through the nozzle $A^5$ stirs up the sand and assists its flow out from the nozzle $A^2$. The outlet $A^4$ is connected to an ascending pipe D and the water and sand pass through this pipe D up to a box or receiver E fitted above the containing vessel A. From the top of this box or receiver E a pipe F leads down and away to waste. The sand removed little by little from the hopper $A^1$ through the outlet $A^4$ is washed by the water as it is carried up the pipe D and, when the water and sand enter the box E, the washed sand falls down a central passage $E^1$ leading from the lower part of the box E and is deposited upon the top of the filtering mass B, the washing water and impurities from the washed sand passing up from the box E and away through the pipe F. The passage of the sand down from the lower portion of the box E may be assisted by introducing a jet of water through a small pipe $C^3$ branched off the inlet pipe C which would at the same time assist the flow of the dirty water from the box E through the pipe F.

In this form of filter the sand returned to the mass from the box E falls down centrally within the containing vessel A. Hence there is a tendency for the sand at the top to form a cone somewhat as indicated in Fig. 1. In order to prevent the incoming unfiltered water from the pipe C from unnecessarily disturbing the upper part of the sand, a shield or baffle G is provided which directs and distributes the bulk of the incoming water toward the walls of the container A.

The outlet for the filtered liquid in the construction illustrated in Fig. 1 is from the central space within the containing vessel A, the filtered liquid being collected in a vessel H and passing out through a ring pipe $H^1$ to a pipe $H^2$. Above the vessel H is a perforated tray J which is surrounded by a cylindrical portion $H^3$ forming an upward extension of the walls of the vessel H. Upon this tray J some coarse filtering material $B^1$ may be placed. This central disposition of the outlet for the filtered water coöperates with the baffle or shield G which directs the incoming unfiltered water toward the walls of the container A, to prevent the filtering medium adjacent to the outlet for the filtered liquid being disturbed by the main body of the filtering mass as it travels toward the point from which it is withdrawn and it is a recognized advantage in filters that the medium near the outlet shall remain comparatively undisturbed. In Fig. 1, two chain lines $a$ indicate approximately the upper boundary of the undisturbed medium. The main lines of motion of the filtering medium B lead downward between the lines $a$ and the walls of the containing vessel A so that the sand moving downward to replace that taken away by the ejector at the bottom of the hopper $A^1$ passes between the cylinder $H^3$ and the lower part of the walls of the containing vessel A. Another advantage of the shield or baffle G is that the incoming liquid is distributed more or less evenly and gently and thus does not break up the filtering layers which have been formed near the surface of the medium B and which might be injured if the whole of the incoming liquid were allowed to fall directly upon the top of the mass in a straight column.

The filter illustrated in Fig. 2 resembles that shown in Fig. 1 so far as the main lines of its construction are concerned, the material B being gradually removed from the bottom by the ejector-like action of unfiltered water passing through the pipe $C^1$ and the removed sand, after washing in the box E, being deposited on the top of the mass. The internal arrangements for the distribution of the sand and the collection of the filtered liquid are, however, somewhat different. The filtered liquid is collected in an annular receiving space K extending around the lower portion of the containing vessel A and separated therefrom by a perforated wall or cover $J^1$ upon which some coarse filtering material $B^1$ may be placed. As will be seen from Fig. 2, in this particular construction the filtered water passes away from the annular collecting pipe K down through one of the supporting legs, which is made hollow for the purpose, to the outlet pipe $H^2$. Thus, in this instance, that portion of the filtering mass which it is desirable to retain undisturbed is situated adjacent to an annular external outlet instead of a central internal outlet. Accordingly, a central core or guide is provided in the form of a tapered conical member L suspended from the cover of the vessel A by strap $L^1$ and extending downward until it terminates in a conical form within the hopper-like bottom $A^1$ of the container A. A further difference between the two constructions is that the washed sand descending from the bottom of the box E does not pass down on to the center of the mass but is deflected by a baffle $G^1$ and distributed with the incoming unfiltered water from the pipe C to the outside edge of the top of the filtering mass. By this arrangement the top of the mass takes the form of an inverted cone as indicated in Fig. 2, and the main lines of motion of the filtering medium B near the bottom of the container A are found to lie around the core L and to leave undisturbed the filtering medium adjacent to the annular outlet K. The boundary of the undisturbed portion may be indicated roughly by the chain lines $a^1$ in Fig. 2.

It will be appreciated that whether the washed sand be returned centrally as in Fig. 1, or directed to the edges as in Fig. 2, the area of the filtering films which form on the top surface of the mass is greater than the crosss-sectional area of the containing vessel owing to the fact that the top of the material asssumes either a conical or inverted conical form.

In order that the operation of the filter shall be automatic, it is preferred to control the ejector, that is to say, to regulate the withdrawal of the filtering medium, according to the rate at which the filter is working. This may be done conveniently by some such arrangement of mechanism as is indicated in Fig. 4 where M indicates some form of rotary meter placed in the main C for the incoming unfiltered liquid. A pinion $M^1$ on the spindle of this meter drives a gear wheel $M^2$ which in its turn drives, through a pinion $M^3$, another gear wheel $M^4$. On the spindle or shaft $M^5$ of this gear wheel $M^4$ is fixed a trigger or catch N adapted to engage once in each revolution of the spindle $M^5$ with the end of a loaded arm or latch $N^1$ pivoted as at $N^2$ to the casing of a small hydraulic cylinder O. The piston of this cylinder is connected to two cocks P both on the same axis, one of which controls the pipe $C^1$ supplying water to the ejector, and the other the pipe F through which passes away the dirty washing water. The movements of the piston are controlled by a slide valve which is lifted each time the loaded latch $N^1$ is raised by the trigger N. When this occurs, the movement of the piston causes the cocks P to open. After the trigger N disengages the loaded latch or arm $N^1$, the latter falls and the consequent movement of the piston closes the cocks P. Conveniently the rate of the fall of the loaded latch or arm can be regulated by a cataract piston or dash-pot at R. The details of this mechanism are not shown as they do not in themselves form part of the present invention.

In filtering operations where it is desired to introduce a coagulant, a small pump S may be employed to drive the coagulant from a suitable tank, not shown, through a pipe $S^1$ to the inlet pipe C for the unfiltered water. This pump S may be driven from the spindle of the gear wheel $M^2$ by means of a crank $S^2$ having a stroke which can be varied in length in any convenient way so that the amount of coagulant delivered at each stroke of the pump can be regulated.

By means of this mechanism it will be seen that the filtering medium is removed and replaced at a rate proportional to that of filtration and that, by altering the gear, the ratio between the two rates can be varied to suit the nature of the liquid being filtered or for any other end which may be desired. Again the supply of the coagulant is proportional to the amount of liquid being filtered and, by altering the stroke of the crank, more or less coagulant can be delivered per unit volume of unfiltered water passing to the filter.

What we claim as our invention and desire to secure by Letters Patent is:—

1. The combination with a filter of means whereby the sand or other finely divided medium is transferred during the operation of the filter from one part of the filtering mass to another by the liquid under treatment.

2. The combination with a filter of means whereby the sand or other finely divided medium is automatically transferred little by little from one part of the filtering mass to another by the liquid under treatment during the filtering operation.

3. The combination with a filter of means whereby the sand or other finely divided medium is automatically transferred little by little from one part of the filtering mass to another by the liquid under treatment during the filtering operation, means for washing the medium during its transference and means for regulating the rate of transference in proportion to the amount of liquid treated in the filter.

4. In a filter the combination of a containing vessel for the sand or other filtering medium provided with a main inlet for unfiltered liquid, an outlet for the filtering medium and a second inlet for unfiltered liquid adjacent to the outlet for the filtering medium and means whereby the unfiltered liquid entering by the second inlet and passing out through the outlet for the filtering medium is caused to transfer the filtering medium little by little from such outlet and carry it to the main inlet whence it passes into the containing vessel during the entrance of the main body of unfiltered liquid.

5. The combination with a filter of means whereby the sand or other finely divided medium is automatically transferred during the operation of the filter from one part of the filtering mass to another, means for washing the medium during its transference and a meter operated by the liquid to be treated and acting to control the means for transferring the filtering medium.

6. In a filter the combination of a containing vessel for the sand or other filtering medium provided with an inlet for unfiltered liquid and an outlet for the filtering medium, means for automatically removing the filtering medium from the outlet and for washing and returning it to the top of the filtering mass and a collecting chamber for the filtered liquid so disposed relatively to the inlet for the unfiltered liquid and the outlet for the filtering medium that the filtering medium adjacent to the collecting chamber is undisturbed by the main body of the filtering mass as it travels toward its outlet.

7. In a filter the combination of a containing vessel for the sand or other filtering medium provided with an inlet for unfiltered liquid and an outlet for the filtering medium, means for automatically removing the filtering medium from the outlet and for washing and returning it to the top of the filtering mass, a collecting chamber for the filtered liquid and means for directing the incoming liquid and the washed filtering medium so that the filtering medium adjacent to the collecting chamber for the filtered liquid is undisturbed by the main body of the filtering mass as it travels toward its outlet.

8. In a filter the combination of a containing vessel for the sand or other filtering medium provided with an inlet for unfiltered liquid and an outlet for the filtering medium, means for automatically removing the filtering medium from the outlet, for washing it, and for returning it to the top of the filtering mass, a baffle or spreader within the container adjacent to the inlet for the unfiltered liquid and so disposed as to direct the incoming unfiltered liquid mainly toward the walls of the containing vessel and prevent it from breaking the filtering layers.

9. In a filter the combination of a containing vessel for the sand or other filtering medium having an inlet for unfiltered water and a hopper-like lower portion provided with an outlet for the filtering medium, means for automatically removing the filtering medium from the outlet and for washing and returning it to the top of the filtering mass, a baffle or spreader within the container adjacent to the inlet for unfiltered liquid and so disposed as to direct the incoming unfiltered liquid mainly toward the walls of the containing vessel and prevent it from breaking the filtering layers and a central collecting chamber for the filtered liquid, such chamber being so disposed as to leave an annular space between it and the wall of the container through which space the filtering medium travels mainly on its way to its outlet.

10. In a filter the combination of a containing vessel for the sand or other filtering medium provided with an inlet for unfiltered liquid, an outlet for filtered liquid and an outlet for the filtering medium, an ejector nozzle adjacent to the outlet for the filtering medium, a pipe for supplying unfiltered liquid to the ejector nozzle to remove the filtering medium little by little from the outlet and to wash it, a box or receiver for the washed medium and the working liquid having an opening leading to that part of the filtering mass remote from the ejector nozzle, an outlet for the washing liquid and a conduit leading from the ejector nozzle to the receiver.

11. In a filter the combination of a containing vessel for the sand or other filtering medium provided with an inlet for unfiltered liquid, an outlet for filtered liquid and an outlet for the filtering medium, an ejector nozzle adjacent to the outlet for the filtering medium, a pipe for supplying unfiltered liquid to the ejector nozzle to remove the filtering medium little by little from the outlet and to wash it, a box or receiver for the washed medium and the working liquid having an opening leading to that part of the filtering mass remote from the ejector nozzle, an outlet for the washing liquid, a conduit leading from the ejector nozzle to the receiver and mechanism operated by the liquid under treatment for intermittently rendering the ejector operative.

12. In a filter the combination of a containing vessel for the sand or other filtering medium provided with an inlet for unfiltered liquid, an outlet for filtered liquid and an outlet for the filtering medium, an ejector nozzle adjacent to the outlet for the filtering medium, a pipe for supplying unfiltered liquid to the ejector nozzle to remove the filtering medium little by little from the outlet and to wash it, a box or receiver for the washed medium and the working liquid having an opening leading to that part of the filtering mass remote from the ejector nozzle, an outlet for the washing liquid, a conduit leading from the ejector nozzle to the receiver and mechanism operated by the liquid under treatment for intermittently rendering the ejector operative and for supplying a predetermined quantity of coagulant to the unfiltered liquid.

In testimony whereof we have signed our names to this specification in the presence of two subscribing witnesses.

MARTIN DEACON.
WILLIAM GORE.

Witnesses:
  RIPLEY WILSON,
  C. P. LIDDON.